Aug. 29, 1944.   J. A. MARISON   2,356,940
VEHICLE WHEEL
Filed May 5, 1943   2 Sheets-Sheet 1

INVENTOR
John Agrillo Marison
BY John A. Arrowsmith
ATT'Y

Aug. 29, 1944. J. A. MARISON 2,356,940
VEHICLE WHEEL
Filed May 5, 1943 2 Sheets-Sheet 2

INVENTOR
John Agrillo Marison
BY
John A. Rainsmith
ATTY

Patented Aug. 29, 1944

2,356,940

UNITED STATES PATENT OFFICE 2,356,940

VEHICLE WHEEL

John Agrillo Marison, San Jose, Calif.

Application May 5, 1943, Serial No. 485,959

1 Claim. (Cl. 152—97)

It is one object of my invention to provide a vehicle wheel with a tire or rim that will eliminate the necessity of using the ordinary pneumatic rubber tire and yet will provide the required resiliency.

It is also an object to provide a highly efficient substitute for the pneumatic tire that will eliminate the necessity of using rubber or the like excepting only for the outermost portion which contacts the road.

Finally, it is an object of the invention to provide a structure of the character indicated that will be simple in form and construction, economical to manufacture, strong, durable, and highly efficient in its practical application.

Figure 1:
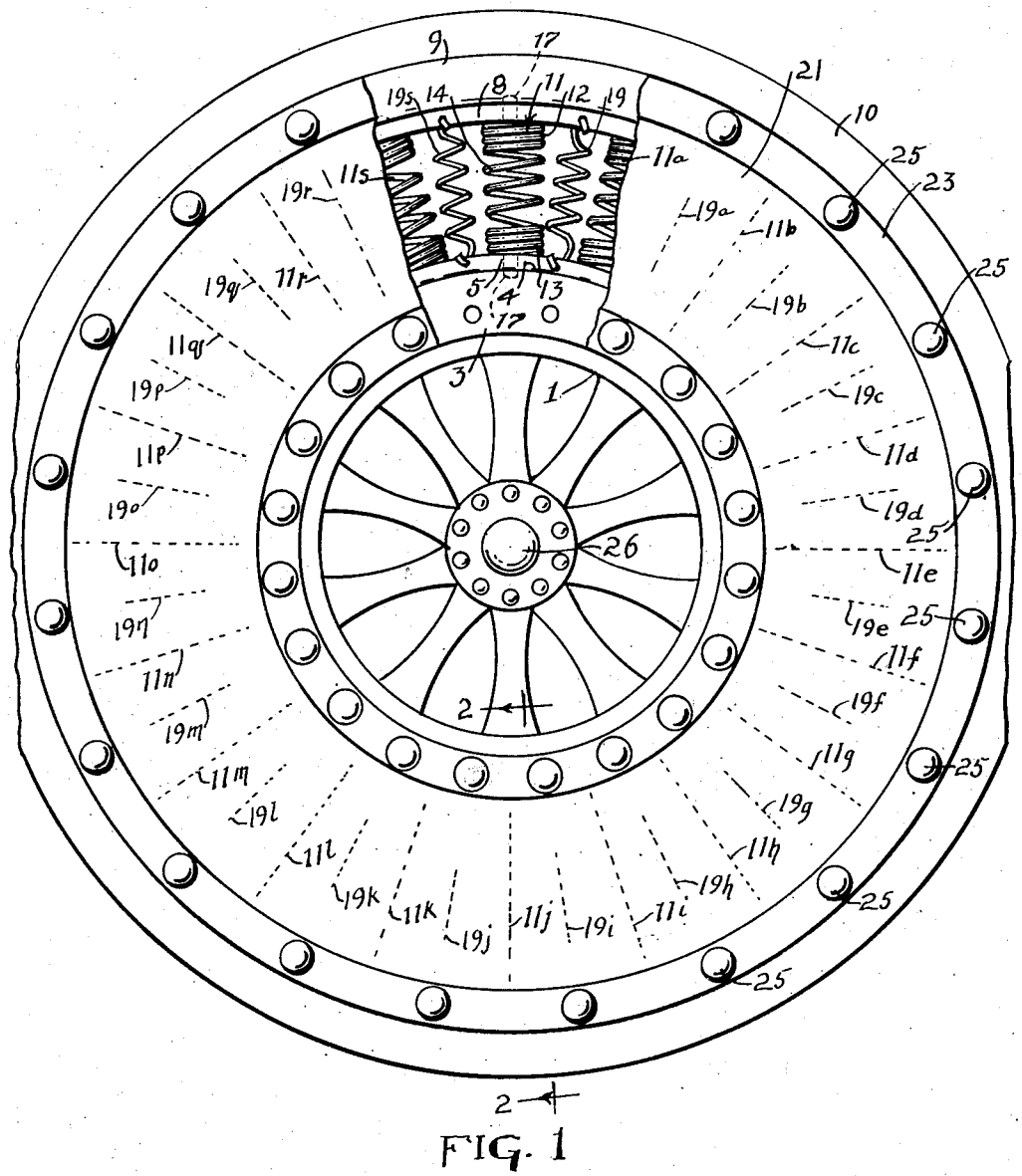
Figure 1 is a side elevation of a wheel embodying my invention, partly broken away.
Figure 2:
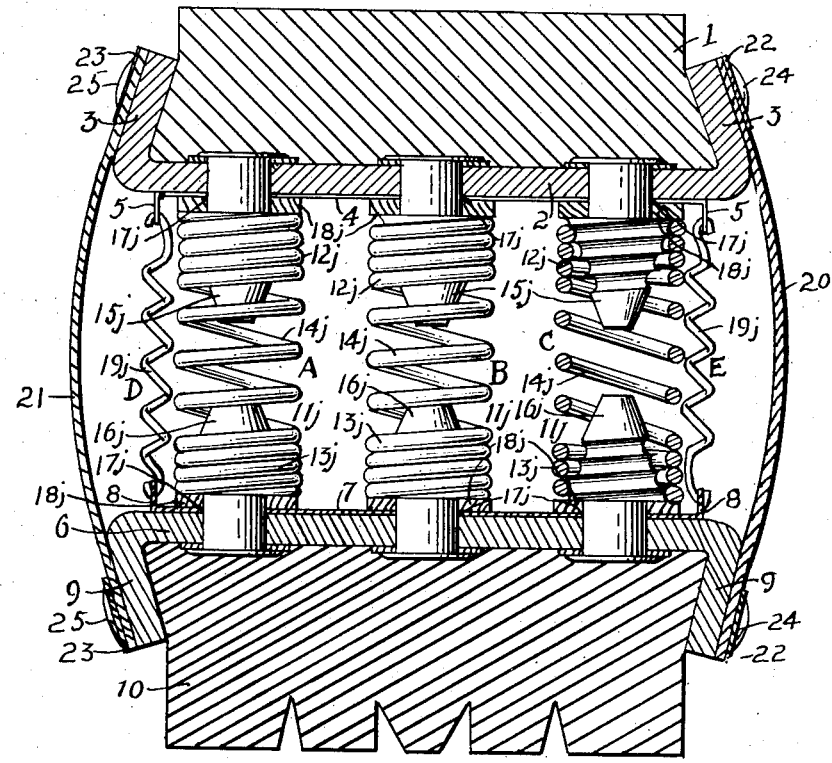
Figure 2 is a sectional view on line 2—2 of Figure 1, greatly enlarged.

Referring now more particularly to the drawings, I show at 1 the central rigid portion of the wheel, a part which may be made in any suitable manner.

The part 1 is fitted with a rigid metal encircling rim 2 provided with flanges 3 on the sides turned back to overlie the sides of part 1. Seated upon the outer surface of rim 2 is an annular member 4, formed of much lighter material and provided with outwardly turned flanges as shown at 5.

Spaced from the rim 2 is a rigid encircling member as 6 of the same width as rim 2, and having a lighter annular member 7 seated on its inner side as shown. The member 7 is of the same width as member 4 and has similar inwardly turned flanges formed thereon as at 8, the member 6 also having outwardly turned side flanges 9 formed thereon.

The outer member 6 is fitted with a suitable tread of any suitable material as 10.

Seated between the opposing surfaces of the two members 4 and 7 are three annular rows of helical springs, as at A, B and C, in the present instance with twenty springs in a row, positioned as indicated at 11 to 11s, inclusive.

Each spring is uniform in diameter throughout its length, but has a number of closed coils at each end as at 12 and 13, a number of spaced intermediate coils as indicated at 14. Each spring is held in place on the parts 2 and 6 by means of screw top pins as 15 and 16. The screw top is conical in form as shown while the base portion of each pin is cylindrical and passes through holes as 17 in the parts to which it is attached. Each top portion of each pin seats on an elastic cushion as at 18 which conforms to the curvature of the member on which it is placed. Each spring is normally a little longer than the space between the members 4 and 7, is slightly compressed with a suitable tool while in place on the pin, the pin eased into position and riveted.

While it may not be necessary in all installations I have herein shown two rows of expanded helical springs as D and E attached to the opposing flanges 5 and 8 as shown. There are twenty of these springs in each annular row as indicated at 19 to 19s inclusive. These springs are normally somewhat shorter than the space between the opposing flanges 5 and 8 and when placed in position are always under tension.

At 20 and 21 are flexible members placed over both sides of the structure described and sealed in position by means of bands as 22—23 fastened as indicated at 24 and 25. These members permit free play of the movable parts of the structure and yet prevent access of moisture and foreign material to the spring structure.

When a wheel is built in accordance with this disclosure a weight on the axle 26 will cause the top spring 11 to expand and the bottom spring at 11j to contract, all of the intermediate like springs acting accordingly. The formation of the spring will permit the lower spring 11j and the top spring 11 to be compressed and expanded equally and yet the fixed ends of the intermediate springs can be offset relative to their axes as shown in Figure 3.

Figure 3:
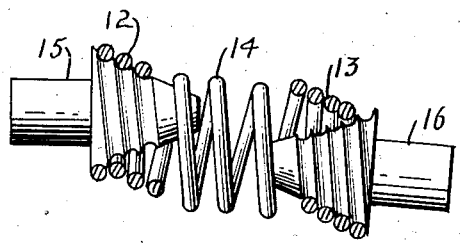
Figure 3 is a detail view showing one of the springs on its mounts and when subjected to a deforming lateral pressure.

The screw top pins 15 and 16 are offset a varying distance according to their position, but this offsetting movement is limited because when it tends to become excessive the coils of the spring at each end seat in the opposite sides of the screw top pins as shown in Figure 3, the spaced coils of the center of the spring accommodating themselves to any such movement. The pins 15—16 are proportioned to contact to prevent excessive approach of part 6 to part 2.

The springs 19 to 19s are placed in position while expanded and consequently are always under tension, and their usefulness becomes apparent when there is a tendency for one rim as 7 to rotate relative to the other rim 2. This may occur when power is applied to force the vehicle to move and the rim 2 moves before the rim 7 starts to rotate, as when the vehicle is heavily loaded or a quick start is attempted. Under such conditions the rows of springs A, B and C do not provide the necessary lateral resistance, but the rows D and E offer such resistance all of the time and rapidly increases when there is a tendency for one rim to rotate relative to the other.

Although but one specific embodiment of the invention has been herein illustrated and described, it will be understood that various alterations in the details of construction and method of assembly may be made without departing from the scope of the invention as indicated in the accompanying claim.

I claim:

A flexible unit to be inserted between the inner and outer relatively shiftable rims of a spring tire comprising, a pair of opposed conical screw top pins, a helical spring of uniform diameter substantially equal to the diameter of the base portion of said pins mounted thereon and having closely coiled end portions encompassing said conical pins and spaced central coils between said pins.

JOHN AGRILLO MARISON.